Sept. 5, 1944.        D. J. COUGHLIN              2,357,504
                      BICYCLE PARKING RACK
              Filed Nov. 30, 1943        2 Sheets-Sheet 2
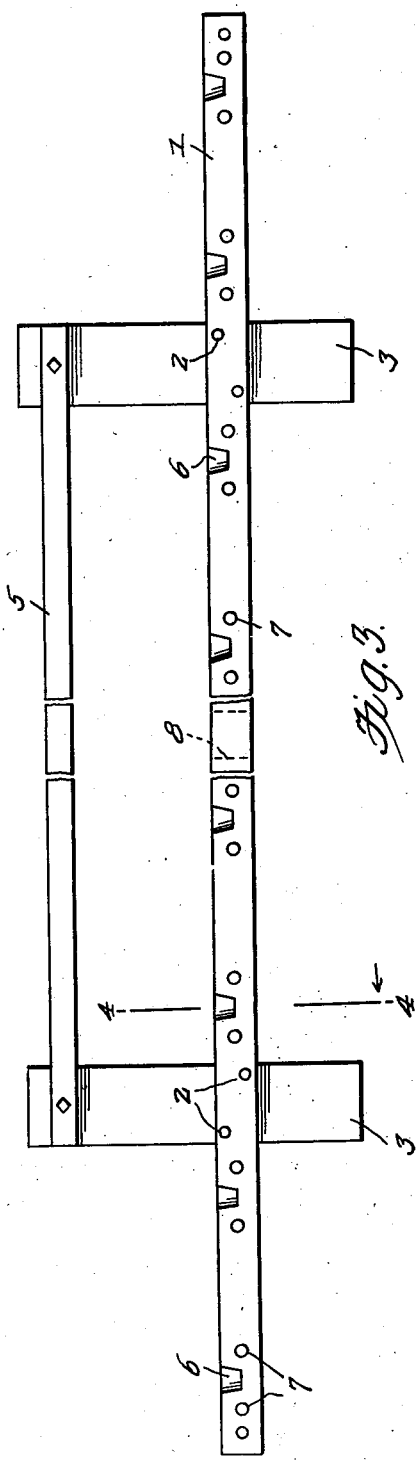
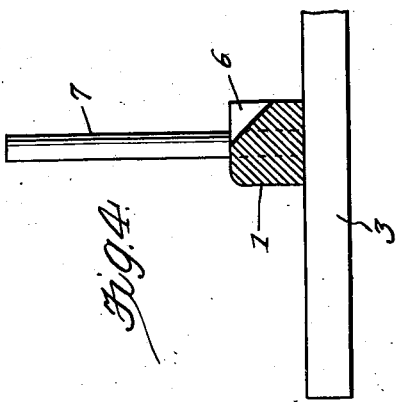
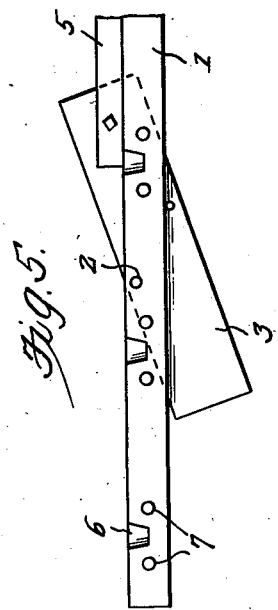
Inventor
DAVID JAMES. COUGHLIN
By *Clarence A. O'Brien and Harvey B. Jacobson*
Attorneys Patented Sept. 5, 1944

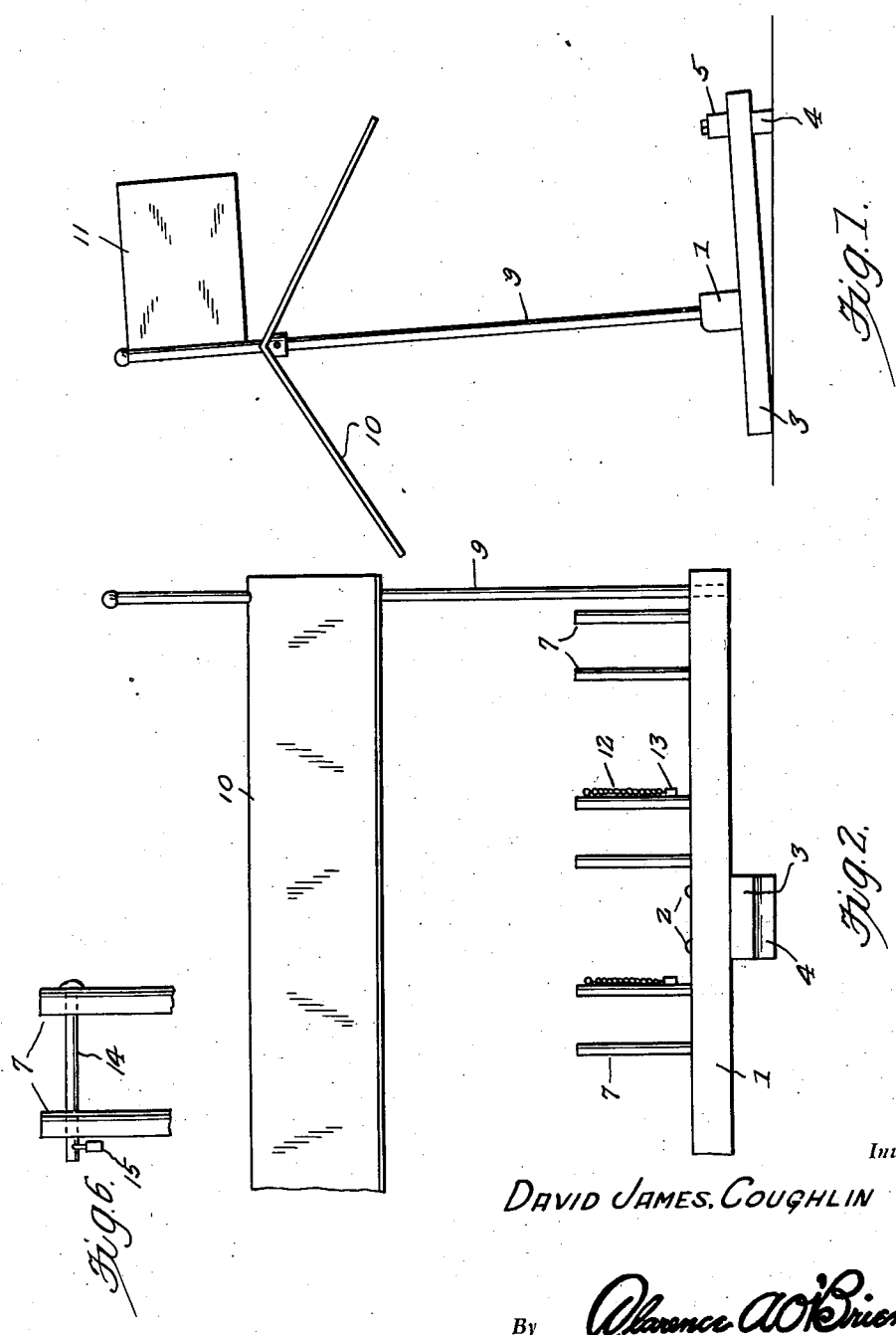

2,357,504

UNITED STATES PATENT OFFICE 2,357,504

BICYCLE PARKING RACK

David James Coughlin, Portage, Wis., assignor of one-third to Phillip Owens, Portage, Wis.

Application November 30, 1943, Serial No. 512,393

1 Claim. (Cl. 211—22)

The present invention relates to new and useful improvements in bicycle racks, and has for its primary object to provide, in a manner as hereinafter set forth, a device of this character comprising a unique construction and arrangement, whereby a plurality of bicycles may be conveniently parked in a limited space.

Another important object of the invention is to provide a parking rack of the aforementioned character embodying means for securing the bicycles against theft or unauthorized removal.

Still another important object of the invention is to provide a bicycle rack of the character described which, when being transported, will require a minimum of space.

Other objects of the invention are to provide a bicycle parking rack which will be comparatively simple in construction, strong, durable, reliable in use and which may be manufactured at low cost.

All of the foregoing, and still further objects and advantages of the invention will become apparent from a study of the following specification, taken in connection with the accompanying drawings, wherein like characters of reference designate corresponding parts throughout the several views, and wherein:

Figure 1 is a view in end elevation of an embodiment of the invention.

Figure 2 is a view in front elevation of one end portion of the device.

Figure 3 is a top plan view with the cover or canopy omitted.

Figure 4 is a cross sectional view, taken substantially on the line 4—4 of Figure 3.

Figure 5 is a top plan view of one end portion of the base structure, showing said base structure folded.

Figure 6 is an elevational view, showing a locking means for the bicycles.

Referring now to the drawings in detail, it will be seen that reference character 1 designates a bar of suitable dimensions and material. Secured transversely by bolts 2 beneath the bar 1 are base members 3 which may also be of any suitable material. Secured transversely beneath one end portion of the base members 3 are feet or cleats 4 for supporting said base members at an inclination out of contact with the ground with the exception of the forward ends thereof. Mounted on top of the base members 3, adjacent the rear ends thereof, is a bar 5 which parallels the bar 1 in spaced relation thereto.

The bar 1 has formed in its upper, rear corner portion a series of longitudinally spaced notches or recesses 6 for the reception of either the front or the rear wheels of the bicycles. Rising from the bar 1 adjacent opposite sides of the recesses 6 are pairs of posts 7 for the reception of the bicycle wheels therebetween. The posts 7 may be mounted on the bar 1 in any suitable manner. Secured at an intermediate point beneath the bar 1 is a supporting cleat 8.

Poles 9 are mounted on the end portions of the bar 1. Mounted on the poles 9 is an anticlinal roof or canopy 10. Also mounted on the poles 9, above the canopy 10, are suitable flags 11.

It is thought that the manner in which the rack is used will be readily apparent from a consideration of the foregoing. Briefly, the front or rear wheel of a bicycle to be parked is pushed across the bar 1 between a pair of the posts 7 and engaged with the bar 5, said wheel resting in one of the notches or recesses 6. Thus, the members 1 and 5 provide what may be considered a cradle for the wheel and the bicycle is prevented from falling over by the posts 7. If desired, the bar 5 may be the same length as the bar 1. Chains 12 are secured on one of each of the pairs of posts 7, said chains being provided with suitable locks 13 for securing the bicycles against theft. Or, as illustrated to advantage in Figure 6 of the drawings, the upper end portions of the pairs of posts 7 may be apertured to slidably receive bolts 14 which may pass through the wheel. The bolts 14 are provided with openings in one end portion for receiving padlocks 15 for preventing removal of said bolts, thus locking the bicycles to the rack. The canopy 10 is removable from the poles 9 and said poles are removable from the bar 1 to facilitate shipment or transportation of the device. Then, as suggested in Figure 5 of the drawings, by removing one of each of the pairs of bolts 2, the base structure may be folded by swinging the members 3 on the bar 1 until the bar 5 is in side abutting engagement therewith.

It is believed that the many advantages of a bicycle parking rack constructed in accordance with the present invention will be readily understood, and although preferred embodiments are as illustrated and described, it is to be understood that further modifications and changes in the details of construction may be resorted to which will fall within the scope of the invention as claimed.

What is claimed is:

A bicycle parking rack comprising a bar, elongated base members mounted transversely beneath said bar at spaced points, feet mounted beneath one end portion of the base members for supporting same at an inclination, a second bar mounted on said one end portion of the base members in spaced parallelism with the first-named bar, said first-named bar having spaced recesses therein for the reception of the wheels of bicycles, the first and second-named bars for receiving therebetween and supporting the bicycle wheels, and pairs of posts on the first-named bar adjacent opposite sides of the recesses for receiving the wheels therebetween and supporting the bicycles in an upright position, said base members being swingable on said bars to dispose the same obliquely of the bars and the bars into engaging side by side relation to fold the rack.

DAVID JAMES COUGHLIN.